United States Patent
Wier

(10) Patent No.: US 6,745,970 B2
(45) Date of Patent: Jun. 8, 2004

(54) BELT RETRACTOR FOR A VEHICULAR SEAT BELT

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/208,923

(22) Filed: Jul. 31, 2002

(65) Prior Publication Data

US 2003/0038202 A1 Feb. 27, 2003

(30) Foreign Application Priority Data

Aug. 21, 2001  (DE) ..................... 201 13 834 U

(51) Int. Cl.⁷ ............................................... B65H 75/48
(52) U.S. Cl. .................................................... 242/379.1
(58) Field of Search ..................... 242/379.1; 297/475, 297/476, 477, 478; 280/805, 806

(56) References Cited

U.S. PATENT DOCUMENTS

| | | | | |
|---|---|---|---|---|
| 3,857,528 A | * | 12/1974 | Fiala .................. | 242/379.1 |
| 5,522,564 A | * | 6/1996 | Schmidt et al. .......... | 242/379.1 |
| 5,961,060 A | * | 10/1999 | Brambilla et al. ....... | 242/379.1 |
| 5,984,223 A | * | 11/1999 | Hiramatsu ............ | 242/379.1 |
| 6,012,667 A | | 1/2000 | Clancy, III et al. | |
| 6,241,172 B1 | * | 6/2001 | Fugel et al. ............. | 242/379.1 |
| 6,250,579 B1 | | 6/2001 | Bannert et al. | |
| 6,264,127 B1 | | 7/2001 | Blackadder et al. | |
| 6,419,178 B1 | * | 7/2002 | Kohlndorfer et al. .... | 242/379.1 |

FOREIGN PATENT DOCUMENTS

| | | |
|---|---|---|
| DE | 29622181 U1 | 5/1997 |
| DE | 19653510 A1 | 6/1997 |
| DE | 19650494 A1 | 6/1998 |
| DE | 20004674 U1 | 9/2000 |
| DE | 20007238 U1 | 9/2000 |
| DE | 19780583 C1 | 1/2001 |
| DE | 19927427 A1 | 1/2001 |

* cited by examiner

Primary Examiner—William A. Rivera
(74) Attorney, Agent, or Firm—Tarolli, Sundheim, Covell & Tummino L.L.P.

(57) ABSTRACT

A belt retractor for a vehicular seat belt comprises a belt reel rotatably mounted in a frame, two locking discs for blocking the belt reel and two energy absorbing elements. The energy absorbing elements are each connected at an axial end to a locking disc and one of which is non-rotatably connected at an axial end to the belt reel. The belt retractor further comprises two locking pawls that are capable of cooperating with the locking discs. At least one of said locking pawls is releasably connected in a starting position to the frame by a connecting element.

19 Claims, 6 Drawing Sheets

BELT RETRACTOR FOR A VEHICULAR SEAT BELT

TECHNICAL FIELD

The invention relates to a belt retractor for a vehicular seat belt.

BACKGROUND OF THE INVENTION

A conventional belt retractor comprises a belt reel rotatably mounted in a frame, two locking discs for blocking the belt reel, two energy absorbing elements, each of which is connected at one axial end to a locking disc and one of which is non-rotatably connected at an axial end to the belt reel, and two locking pawls capable of cooperating with the locking discs. Energy absorbing elements of a belt retractor serve to permit a controlled return rotation of the belt reel, i.e. in the unreeling direction of the webbing when the belt retractor is itself blocked, as soon as high forces act on the seat belt made available by the belt retractor. It is in this way that a force limiting function is achieved. The belt retractor provided with a force limiting function permits a controlled forward movement of the upper body of the vehicle occupant, achieved ultimately by plastic deformation of the energy absorbing elements.

Various concepts have already been proposed for influencing the webbing force from which the controlled return rotation of the belt reel in the unreeling direction of the webbing materializes. Depending on the severity of the collision and weight of the vehicle occupant to be restrained the intention is to achieve adaptation to the force with which the webbing is unreeled. One possibility of influencing the force of the webbing is to selectively activate/deactivate one of the energy absorbing elements, this also needing to be reliably assured in case the belt retractor is blocked.

The object of the invention is to further develop a belt retractor of the aforementioned kind to the effect that the force with which the webbing is unreeled can be reliably altered even during the belt reel being blocked.

BRIEF SUMMARY OF THE INVENTION

According to the invention, a belt retractor for a vehicular seat belt comprises a belt reel rotatably mounted in a frame, two locking discs for blocking the belt reel and two energy absorbing elements. The energy absorbing elements are each connected at an axial end to a locking disc and one of which is non-rotatably connected at an axial end to the belt reel. The belt retractor further comprises two locking pawls that are capable of cooperating with the locking discs. At least one of the locking pawls is releasably connected in a starting position to the frame by a connecting element. Making use of such belt retractor now makes it possible, for example, where a heavy vehicle occupant or a severe collision is concerned, to make use of an energy absorbing element having a high torsional resistance. If adaptation is needed, for example, during a lighter-weight vehicle occupant being jolted forwards or in the case of a less severe collision, then the connecting element can be moved by an unlocking element into an end position, so that the locking pawl is released from the frame, and locking pawl and frame are no longer connected to each other. This results in a second energy absorbing element being made use of to reduce the torsional resistance so that it results in lighter restraining forces acting on the vehicle occupant.

It is preferably provided for that the unlocking element can be acted upon by an actuating element. The unlocking element is a simple mechanical component capable of reliably acting on the connecting element when the unlocking element is acted upon by the actuating element. Hence, this makes it possible by particularly simple and rugged means to release the locking pawl from the frame and, with this, to make use of the second energy absorbing element such that a reduced belt unreeling force is produced.

In a further advantageous embodiment it is provided for that the connecting element comprises a mounting hole in which an axle is mounted, and the locking pawl comprises an aperture by which it is pivotally mounted on the axle. When the connecting element is urged from its original position by action of the unlocking element, the locking pawl is able to leave its locating position on the axle. When the aperture in the locking pawl has substantially the shape of an elongated hole and comprises a constriction, the axle is able to overcome the constriction as of a defined force and the locking pawl is released. This can be achieved also by the aperture in the locking pawl being covered in a partial area by a thin wall element. As of a defined force, the axle is able to break open the wall element and the locking pawl can leave its locating position on the axle.

Advantageous aspects of the invention will be apparent from the subclaims.

DETAILED DESCRIPTION OF THE PREFERRED EMBODIMENTS

Figure 1:
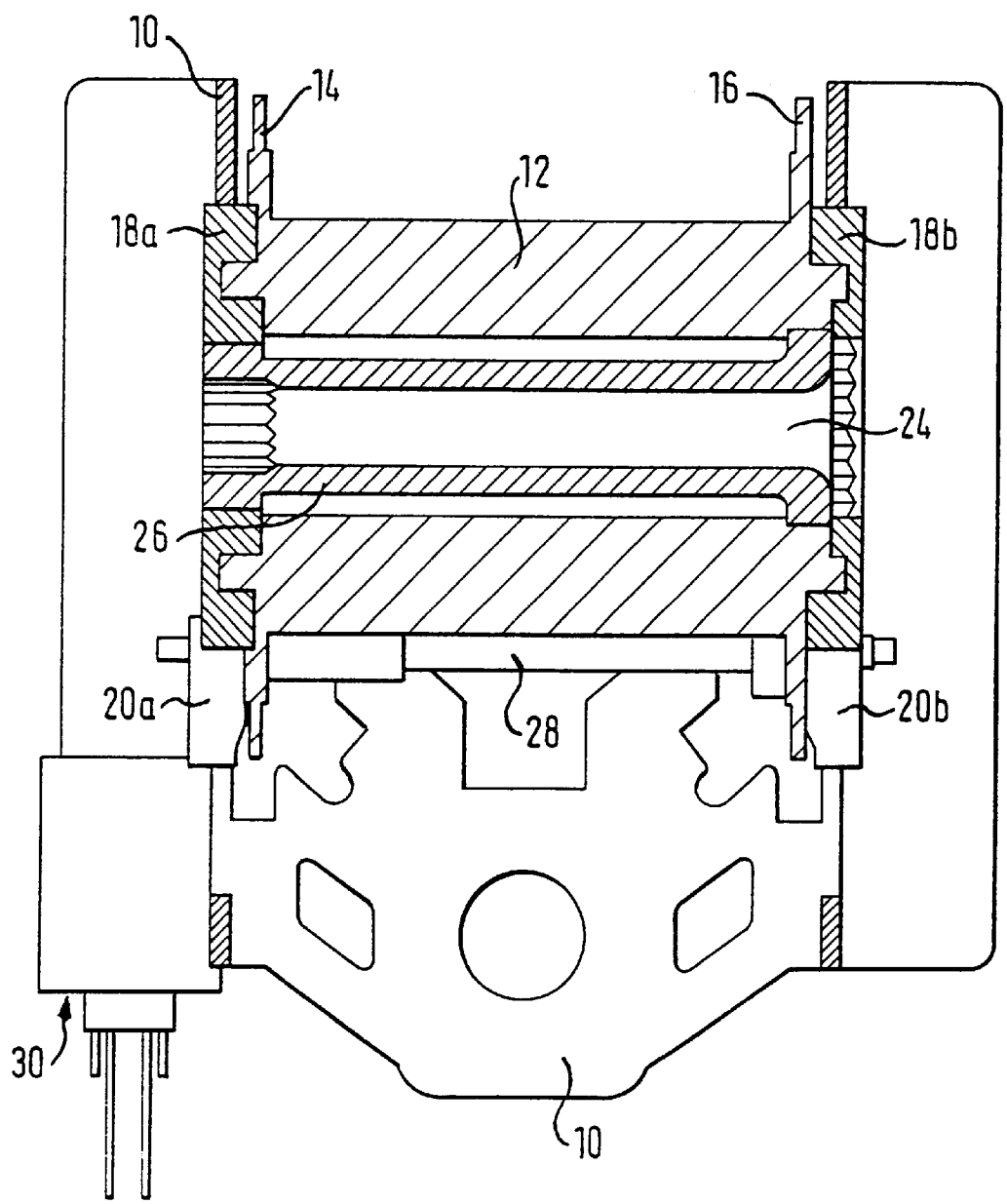
FIG. 1 is a partial section view showing a first embodiment of a belt retractor in accordance with the invention.
Figure 2:
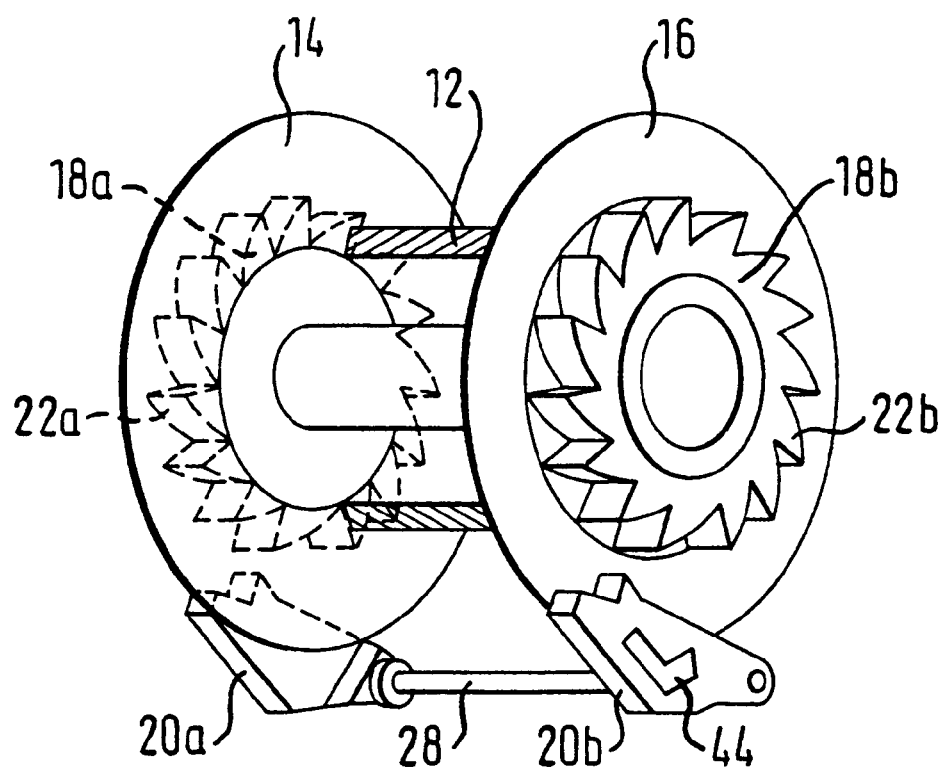
FIG. 2 is a partial view in perspective showing the first embodiment of the belt retractor in accordance with the invention.

Referring now to FIG. 1 there is illustrated a belt retractor comprising a frame 10 in which a belt reel 12 is rotatably mounted. The belt reel 12 comprises two flanges 14, 16 between which a seat belt (not shown) can be reeled. A locking disc 18a is provided at the, with regard to FIG. 1, left-hand axial end of the belt reel 12. A second locking disc 18b is provided at the, with regard to FIG. 1, right-hand axial end of the belt reel. Mounted at the frame 10 are two locking pawls 20a, 20b which by means of a conventional locking mechanism (not shown) can be caused to engage into locking teeth 22a, 22b (see FIG. 2) configured on the locking discs 18a, 18b.

Figure 3:
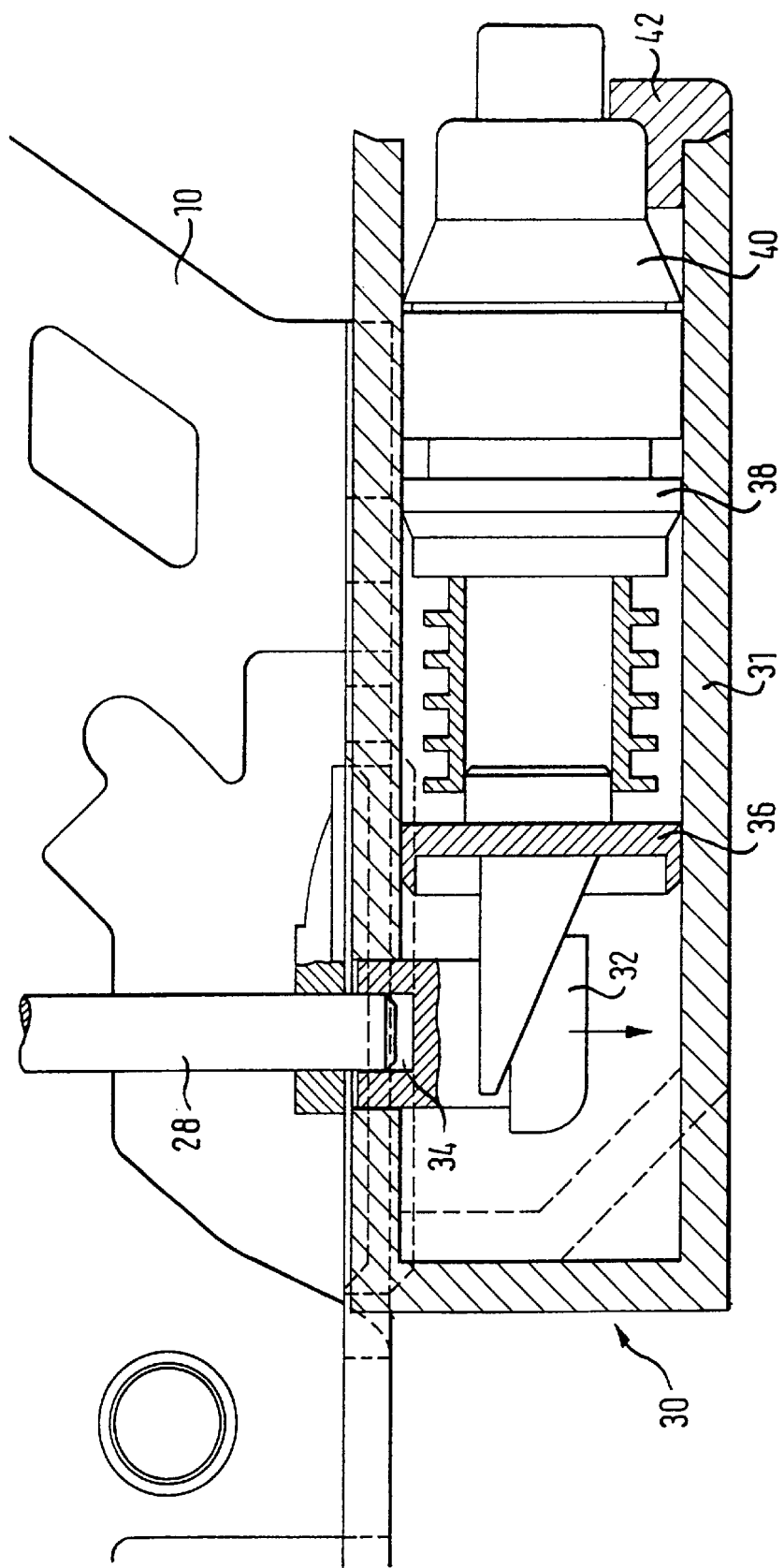
FIG. 3 is sectioned partial view showing the first embodiment of the belt retractor in accordance with the invention.
Figure 4:
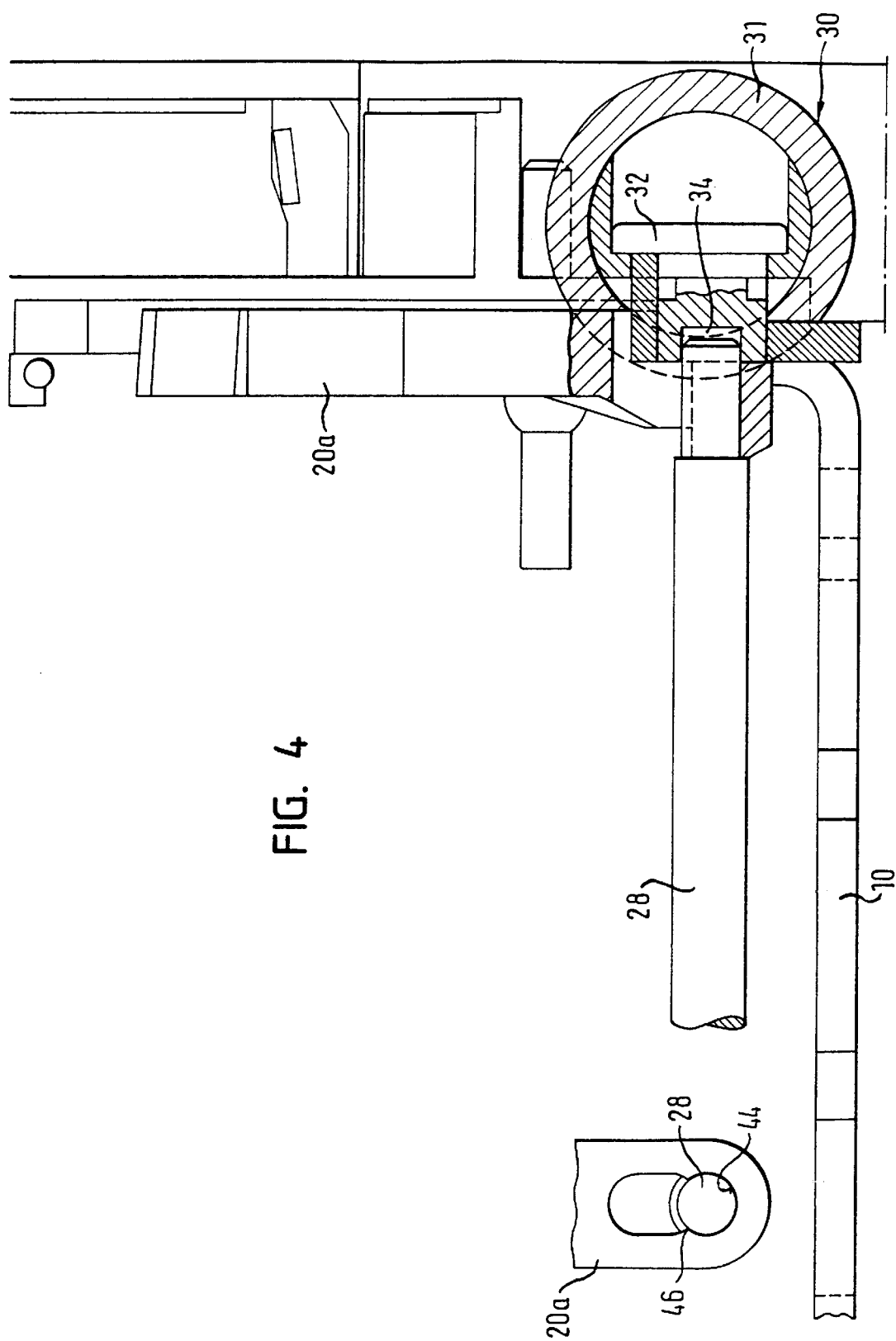
FIG. 4 is a further sectioned partial view showing the first embodiment of the belt retractor in accordance with the invention.

In the embodiment shown here, there are arranged in a space-saving way in the interior of the belt reel 12 a torsion bar 24 and a torsion tube 26 surrounding the latter concentrically, both of which serve as energy absorbing elements. The torsion bar 24 and the torsion tube 26 are non-rotatably connected at their, with regard to FIG. 1, left-hand axial end to the locking disc 18a. At its, with regard to FIG. 1, right-hand axial end the torsion bar 24 is non-rotatably connected to the locking disc 18*b* and the torsion tube 26 is non-rotatably connected to the belt reel 12. For the purpose of non-rotatably connecting, an unlocking element serration may be employed in each case. The two locking pawls 20*a*, 20*b* are non-rotatably connected to each other by means of an axle 28. Arranged on this axle 28 is a decoupling device 30 in a housing 31 as shown in FIGS. 3 and 4. The decoupling device 30 is capable of releasing the connection between the locking pawls 20*a* and 20*b*.

Referring now to FIGS. 3 and 4 there is illustrated the decoupling device in detail. A connecting element 32 having a mounting hole 34 is arranged on the frame 10 such that the axle 28 connecting the locking pawls 20*a* and 20*b* engages the mounting hole. Arranged on the connecting element 32 is an unlocking element 36 which in the embodiment as shown can be acted upon by a piston 38 seated on an actuating element 40. This permits a particularly simple and reliably way of transferring the force from the actuating element 40 to the unlocking element 36. The actuating element 40 is arranged at the, with regard to FIG. 3, right-hand end of the housing 31 which is closed off by a plug 42.

The locking pawl 20*a* comprises an aperture 44 by which it is pivotally mounted on the axle 28. This aperture has in the embodiment shown substantially the shape of an elongated hole and comprises a constriction 46. The connecting element 32 engages in the, with regard to FIG. 4, upper part of the aperture 44 such that the axle 28 is reliably rotatably mounted in the, with regard to FIG. 4, lower part of the aperture 44. In an alternative embodiment there may be arranged a thin wall element in the, with regard to FIG. 4, upper part of the aperture 44, which wall element instead of the constriction fixes the axle 28 in place with respect to the locking pawl.

Figure 5:
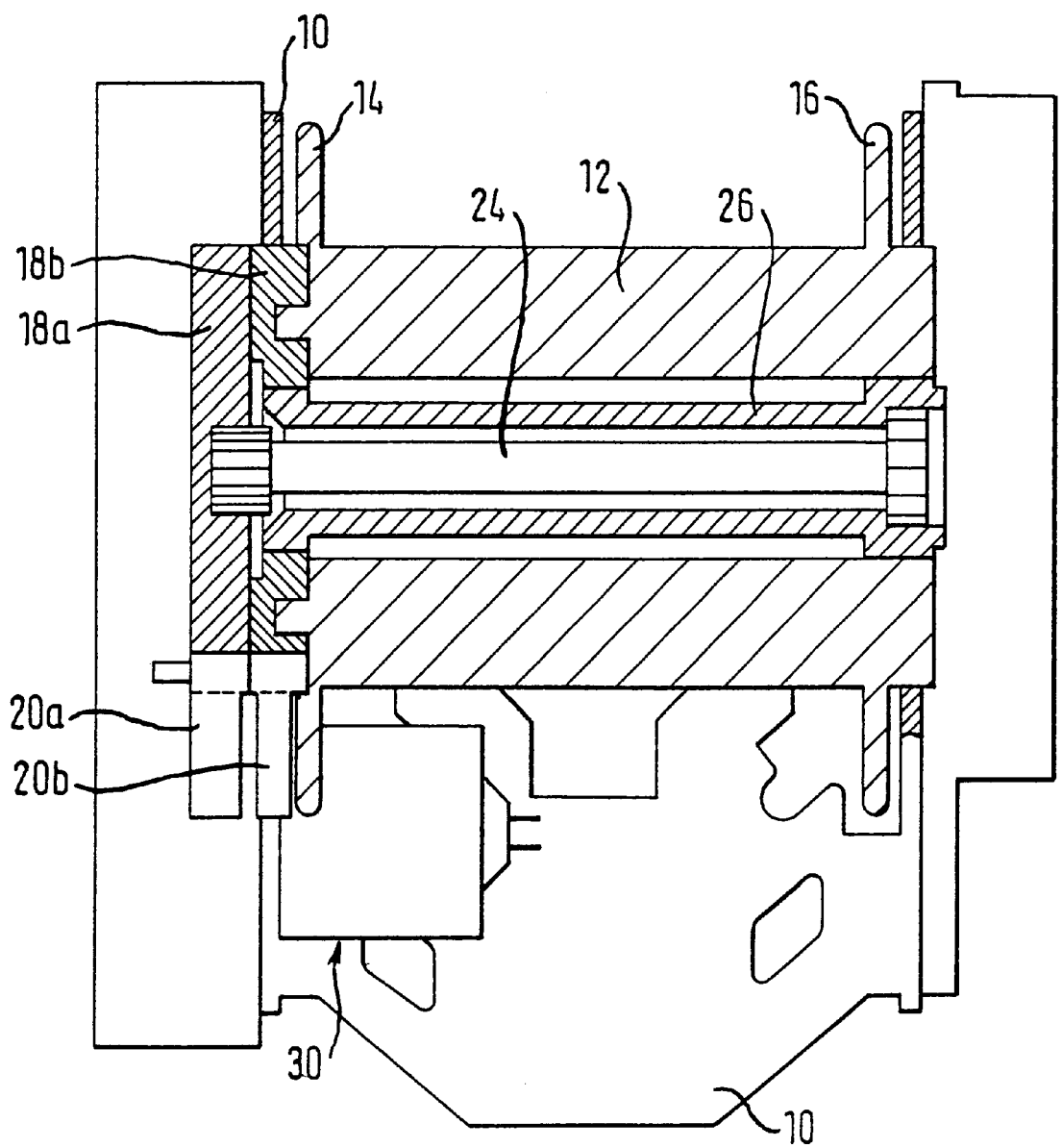
FIG. 5 is a partial section view showing a second embodiment of the belt retractor in accordance with the invention and FIG. 6 is a further partial view in perspective showing a further embodiment of the belt retractor in accordance with the invention.

Referring now to FIG. 5 there is illustrated the belt retractor in a further preferred embodiment in which the two locking discs 18*a*, 18*b* are arranged at the, with regard to FIG. 5, left-hand axial end of the belt reel 12 and are each non-rotatably connected to the torsion bar 24 and the torsion tube 26, respectively. At the, with regard to FIG. 5, right-hand axial end the torsion bar 24 and torsion tube 26 are non-rotatably connected to the belt reel 12. Here too, a decoupling device 30 is arranged such that the connection between the locking pawls 20*a* and 20*b* is releasable.

Figure 6:
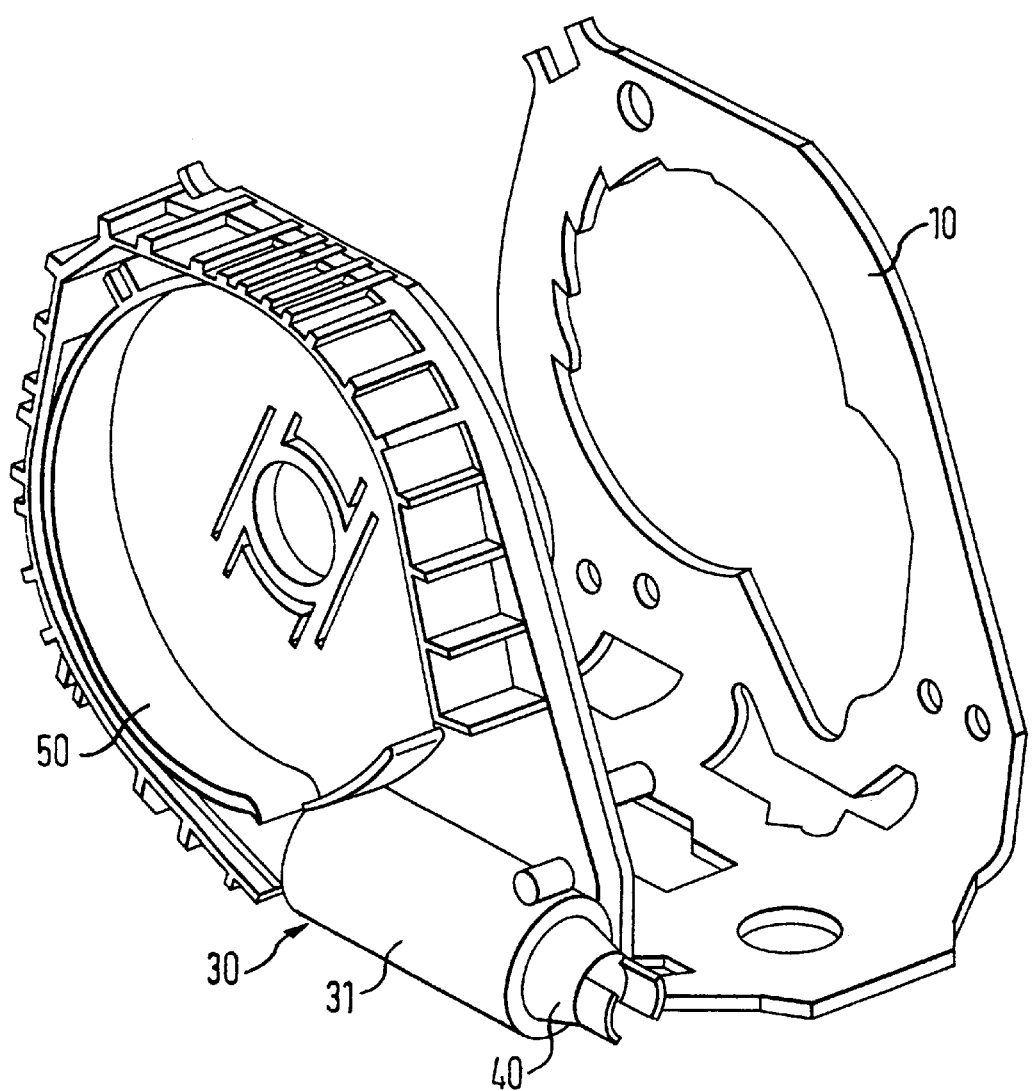

The actuating element 40 is preferably a pyrotechnical device permitting a particularly cost-effective and safe activation. Due to the low amount of energy needed for activation, the pyrotechnical device can be used without a booster charge. The housing 31 is preferably connected in one piece to a spring cassette 50 (FIG. 6), resulting in a reduction in the components and thus in the assembly costs. Due to the energy released being low, the housing 31 can be made of a cost-effective plastics material or metal. The actuating element 40 can be connected to the housing 31 by simple cost-effective means, to advantage by an adhesive or weld, e.g. ultrasonically.

Functioning of the belt retractor as described can be depicted as follows:

In a normal situation, when the belt retractor is subjected to no excessive deceleration and the webbing is not unreeled from the belt reel with high acceleration, the locking pawls 20*a* and 20*b* are located in a position in which they do not engage the locking discs 18*a* and 18*b*. The belt reel is freely rotatable and the webbing can be freely unreeled and reeled therein.

In illustrating activation of the activating device, first consider the belt retractor with the locking pawls and locking discs arranged on both sides as shown in FIG. 1. When the locking pawls 20*a* and 20*b* are activated by the vehicle-sensitive sensor or webbing-sensitive sensor, they engage the locking discs 18*a* and 18*b*. The torsion bar 24 is then blocked at both ends whilst the torsion tube 26 is blocked at one end from rotating in the unreeling direction of the webbing, thus permitting rotation of the belt reel in the unreeling direction of the webbing only when the torsion tube 26 is twisted.

Depending on the various influencing factors such as severity of the collision, stature or weight of the vehicle occupant, the torsional resistance of the torsion tube 26 and the restraining force acting on the vehicle occupant may be excessive. This causes the actuating element 40 to be activated, as a result of which the piston 38 is displaced so that it is able to act on the unlocking element 36 (see FIGS. 3 and 4). The unlocking element 36 moves the connecting element 32 to such an extent that it no longer engages the, with regard to FIG. 4, upper part of the aperture 44 and the axle 28 is no longer held by the mounting hole 34, but now only by the frame 10. The axle 28 is thus able now to overcome the constriction 46 of the aperture 44 in the locking pawl 20*a* at a defined force. This results in the locking pawl 20*a* leaving its location on the axle 28, it no longer being able to satisfy its blocking function. The communication of the torsion tube 26 and torsion bar 24 now achieves a diminished torsional resistance, resulting in a reduction in the force counteracting rotation of the belt reel 12 in the unreeling direction of the webbing.

In a further preferred embodiment the locking discs 18*a*, 18*b* and the locking pawls 20*a*, 20*b* are arranged on one side of the belt reel and the two energy absorbing elements torsion tube 26 and torsion bar 24 act in parallel (FIG. 5). This embodiment has the advantage that three levels are available in this case for limiting the force. When both locking pawls 20*a*, 20*b* are caused to engage the locking teeth 22*a*, 22*b* of the locking discs 18*a*, 18*b*, the two energy absorbing elements torsion tube 26 and torsion bar 24 firstly act in parallel, and the torsional resistances of the two energy absorbing elements torsion tube 26 and torsion bar 24 add up. If only one energy absorbing element is to be available in the case of a lightweight vehicle occupant or a less severe collision, then in this case too, the decoupling device 30 as described makes it possible for one of the locking pawls 20*a*, 20*b* to be moved out of its locating position so that it overcomes the constriction 46 (see FIG. 4) in defeating its blocking function. The force counteracting rotation of the belt reel in the unreeling direction of the webbing now solely results from the moment of torsional resistance of one of the two energy absorbing elements torsion tube 26 and torsion bar 24. When the moment of torsional resistance of the torsion tube 26 differs from that of the torsion bar 24, here again two different levels can be achieved for the unreeling force of the webbing.

The actuating element may also be an electric, electromagnetic or hydraulic means.

What is claimed is:

1. A belt retractor for a vehicular seat belt, said belt retractor comprising a belt reel rotatably mounted in a frame, two locking discs for blocking said belt reel, two energy absorbing elements, each of which is connected at an axial end to a locking disc and one of which is non-rotatably connected at an axial end to said belt reel, and two locking pawls capable of cooperating with said locking discs, at least one of said locking pawls being releasably connected in a starting position to said frame by a connecting element.

2. A belt retractor for a vehicular seat belt, said belt retractor comprising a belt reel rotatably mounted in a frame, two locking discs for blocking said belt reel, two energy absorbing elements, each of which is connected at an axial end to a locking disc and one of which is non-rotatably connected at an axial end to said belt reel, and two locking pawls capable of cooperating with said locking discs, at least one of said locking pawls being releasably connected in a starting position to said frame by a connecting element, the two energy absorbing elements being connected non-rotatably to each other and to one of the locking discs at one of the axial ends while at the other axial end, one of the energy absorbing elements being non-rotatably connected to the belt reel and the other energy absorbing element being non-rotatably connected to one of the locking discs.

3. A belt retractor for a vehicular seat belt, said belt retractor comprising a belt reel rotatably mounted in a frame, two locking discs for blocking said belt reel, two energy absorbing elements, each of which is connected at an axial end to a locking disc and one of which is non-rotatably connected at an axial end to said belt reel, and two locking pawls capable of cooperating with said locking discs, at least one of said locking pawls being releasably connected in a starting position to said frame by a connecting element, said connecting element being moved by an unlocking element from said starting position into an end position in such a way that at least one of said locking pawls and said frame have no connection with each other in said end position.

4. The belt retractor as set forth in claim 3, wherein said unlocking element can be acted upon by an actuating element.

5. The belt retractor as set forth in claim 4, wherein said actuating element comprises a piston section which is capable of acting on said unlocking element.

6. The belt retractor as set forth in claim 4, wherein said actuating element is a pyrotechnical device.

7. The belt retractor as set forth in claim 4, wherein said actuating element is embedded in a housing.

8. The belt retractor as set forth in claim 7, wherein said housing is integrally connected to a spring cassette.

9. The belt retractor as set forth in claim 7, wherein said housing is made of a plastics material.

10. The belt retractor as set forth in claim 7, wherein said housing is made of metal.

11. The belt retractor as set forth in claim 7, wherein said actuating element and said housing are connected to each other by an adhesive.

12. The belt retractor as set forth in claim 7, wherein said actuating element and said housing are connected to each other by a weld spot.

13. A belt retractor for a vehicular seat belt, said belt retractor comprising a belt reel rotatably mounted in a frame, two locking discs for blocking said belt reel, two energy absorbing elements, each of which is connected at an axial end to a locking disc and one of which is non-rotatably connected at an axial end to said belt reel, and two locking pawls capable of cooperating with said locking discs, at least one of said locking pawls being releasably connected in a starting position to said frame by a connecting element, said connecting element being be moved by an unlocking element from said starting position into an end position in such a way that at least one of said locking pawls and said frame have no connection with each other in said end position, said connecting element including a mounting hole in which an axle is mounted, and said locking pawl including an aperture by which it is pivotally mounted on said axle.

14. The belt retractor as set forth in claim 13, wherein said aperture in said locking disc has substantially the shape of an elongated hole and includes a constriction.

15. The belt retractor as set forth in claim 13, wherein said aperture in said locking pawl is covered in a partial area by a thin wall element.

16. The belt retractor as set forth in claim 13, wherein said two energy absorbing elements are arranged inside said belt reel.

17. The belt retractor as set forth in claim 13, wherein said first energy absorbing element is a torsion bar and said second energy absorbing element is a torsion tube.

18. The belt retractor as set forth in claim 13, wherein said locking discs are arranged at two opposite axial ends of said belt reel.

19. The belt retractor as set forth in claim 13, wherein said belt reel has two axial ends and said locking discs are provided in combined arrangement at one of said axial ends of said belt reel.

* * * * *